United States Patent
Drost et al.

(10) Patent No.: US 7,538,633 B2
(45) Date of Patent: May 26, 2009

(54) METHOD AND APPARATUS FOR DRIVING ON-CHIP WIRES THROUGH CAPACITIVE COUPLING

(75) Inventors: Robert J. Drost, Mountain View, CA (US); Ronald Ho, Mountain View, CA (US); Tarik Ono, San Francisco, CA (US)

(73) Assignee: Sun Microsystems, Inc.

( * ) Notice: Subject to any disclaimer, the term of this patent is extended or adjusted under 35 U.S.C. 154(b) by 968 days.

(21) Appl. No.: 10/953,008

(22) Filed: Sep. 28, 2004

(65) Prior Publication Data
US 2006/0075364 A1   Apr. 6, 2006

(51) Int. Cl.
*H01P 5/00* (2006.01)
*H03H 7/00* (2006.01)
(52) U.S. Cl. .................. 333/24 C; 333/172; 333/245
(58) Field of Classification Search .......... 333/24 C, 333/172, 136, 236, 245
See application file for complete search history.

(56) References Cited

U.S. PATENT DOCUMENTS

| | | | | |
|---|---|---|---|---|
| 4,439,727 | A | 3/1984 | Boyle | 324/158 |
| 5,629,838 | A | 5/1997 | Knight et al. | 361/782 |
| 6,496,889 | B1 | 12/2002 | Perino et al. | 710/110 |
| 6,728,113 | B1 | 4/2004 | Knight et al. | 361/760 |
| 6,916,719 | B1 | 7/2005 | Knight et al. | 438/381 |
| 7,064,598 | B2 * | 6/2006 | Willingham et al. | 327/333 |
| 7,272,373 | B2 * | 9/2007 | Tuttle et al. | 455/333 |
| 2002/0003304 | A1 | 1/2002 | Matsunaga et al. | 257/758 |

FOREIGN PATENT DOCUMENTS

EP    0 579 314 A1    1/1994

* cited by examiner

*Primary Examiner*—Dean O Takaoka
(74) *Attorney, Agent, or Firm*—Park, Vaughan & Fleming LLP; Anthony P. Jones

(57) ABSTRACT

One embodiment of the present invention provides a system which drives on-chip wires using capacitive coupling. During operation, the system drives a signal onto a driven wire. This signal feeds from the driven wire through a coupling capacitor onto a coupled wire, which is an on-chip wire that routes the signal to its destination. Feeding the signal through the coupling capacitor reduces the voltage swing of the corresponding coupled signal on the coupled wire, thereby lessening the power required to drive the coupled signal on the coupled wire.

21 Claims, 2 Drawing Sheets

METHOD AND APPARATUS FOR DRIVING ON-CHIP WIRES THROUGH CAPACITIVE COUPLING

GOVERNMENT LICENCE RIGHTS

This invention was made with United States Government support under Contract No. NBCH020055 awarded by the Defense Advanced Research Projects Administration. The United States Government has certain rights in the invention.

BACKGROUND

1. Field of the Invention

The present invention relates to techniques for improving the performance of computer systems. More specifically, the present invention relates to a method and an apparatus for driving on-chip wires through capacitive coupling.

2. Related Art

Sending a high bandwidth data signal across a VLSI chip typically requires a large amount of energy. In fact, in certain scenarios, it can overwhelm mechanisms for both power delivery and heat removal. For example, on a 130 nm chip, running at 1.3V and 3 GHz, transmitting a single bit of data across a 1 cm chip edge consumes over 3 mW of power (assuming typically spaced repeaters along the wire length). Aggregating 10,000 of these wires together in a series of wide buses can consume 30 W to simply switch signals across the wires. It is obviously impractical to consume such large amounts of energy for simply communicating across a chip.

Reducing the voltage swing on these long wires can reduce the energy required to switch signals across the long wires. This is because the energy required to switch a wire is proportional to the voltage swing $\Delta V$. Hence, reducing the voltage swing by 10× reduces the energy by 10× as well. (Note that if the power supply voltage V is also reduced by 10×, the energy will be reduced by 100×: 10× due to the reduced voltage swing and 10× due to the reduced power supply voltage.)

Note that, to operate properly, other components on the chip must still run at the full power supply voltage. Hence, the above approach to reduce the power consumption requires a way to reduce the voltage swing on just the wires, and not across the whole chip.

Currently, there are three popular schemes to reduce the voltage swing for on-chip wires.

In the first scheme, the chip uses a secondary power supply to drive long on-chip wires. For example, all transistors driving the long wires can use a secondary power supply at 130 mV, while the rest of the chip uses the primary supply at 1.3V. This scheme provides a significant reduction of energy consumption on the wire, because energy is proportional to the product of $\Delta V$ and $V_{supply}$. In the above example, the energy consumption is reduced by a factor of 100×: a factor of 10× due to the reduced voltage swing and another factor of 10× due to the reduced power supply.

The problem with this scheme is that it is difficult to design a power grid with the requisite power supply impedance. The power supply impedance is constrained by the allowable voltage "sag" during a peak transient current. Hence, if the voltage of a power supply grid is lowered, the impedance of the power supply must also be correspondingly lowered. Today's high-performance chips have power supply impedances in the milliohms, and designing power grids at these low impedances is already quite expensive. Further reducing the impedance to tenths of milliohms is prohibitively difficult and expensive.

The second scheme to limit voltage swings uses circuits that cut themselves off when driving wires. These circuits use transistors to drive the wire voltage, and when the wire voltage exceeds a cutoff threshold, the transistors turn themselves off. Alternatively, the circuits can use a timing signal to turn themselves off, where this timing signal is designed to match a desired signal swing. The problem with both of these types of circuits is that their swings are not well-controlled and are subject to process, voltage, and temperature variations. To ensure that they work under extreme conditions, these circuits require margining, which greatly reduces their potential energy savings.

For example, a problem can arise if cutoff circuits sense driver-end voltages, which are poorly-matched to voltages at the receiver end of a long wire. This can cause cut-off circuits to switch improperly. Also, timing signals suffer from skew and jitter across wide data-paths. Both of these problems require significant over-design to ensure signal integrity, thereby sacrificing potential energy savings.

In the third scheme, designers can "stack" gates atop each other so that they share the power supply serially. For example, two gates can be stacked atop each other, so that the bottom gate is powered between Ground and $V_{supply2}$, and the top gate is powered between $V_{supply2}$ and $V_{supply}$. This idea can be extended to multiple gates.

However, this scheme complicates the receiver design because different receivers must have different common-mode voltage levels. In the simple example above, receivers for the two gates must be biased to receive data at either the low range or the high range, which leads to multiple receiver designs and wide delay variances between bits.

Hence, what is needed is a method that reduces the power consumed while transferring signals across long on-chip wires without the disadvantages of the schemes described above.

SUMMARY

One embodiment of the present invention provides a system which drives on-chip wires using capacitive coupling. During operation, the system drives a signal onto a driven wire. This signal feeds from the driven wire through a coupling capacitor onto a coupled wire, which is an on-chip wire that routes the signal to its destination. Feeding the signal through the coupling capacitor reduces the voltage swing of the corresponding coupled signal on the coupled wire, thereby lessening the power required to drive the coupled signal on the coupled wire.

In a variation of this embodiment, the coupling capacitor ($C_{coupling}$) in series with the load capacitance ($C_{load}$) of the coupled wire forms a voltage divider that produces $V_{coupled\_wire} = V_{driven\_wire} \cdot (C_{coupling}/(C_{coupling}+C_{load}))$.

In a variation of this embodiment, forming the coupling capacitor involves running the driven wire alongside to the coupled wire for a specified distance with a specified separation.

In a further variation, forming the coupling capacitor involves forking the driven wire and running the driven wire parallel to the coupled wire in the same metal layer as the coupled wire.

In a further variation, forming the coupling capacitor involves forking the coupled wire and running the coupled wire parallel to the driven wire in the same metal layer as the driven wire.

In a further variation, forming the coupling capacitor involves forking the driven wire and running the driven wire parallel to the coupled wire in the metal layers above and below the coupled wire.

In a further variation, forming the coupling capacitor involves forking the coupled wire and running the coupled wire parallel to the driven wire in the metal layers above and below the driven wire.

In a further variation, the coupled wire has a minimum width within the fork.

In a variation of this embodiment, the system applies a bias voltage to the coupled wire, thereby enabling subsequent logical transitions on the coupled wire to occur more quickly.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Driving a Coupled Wire Through a Coupling Capacitor

Figure 1:
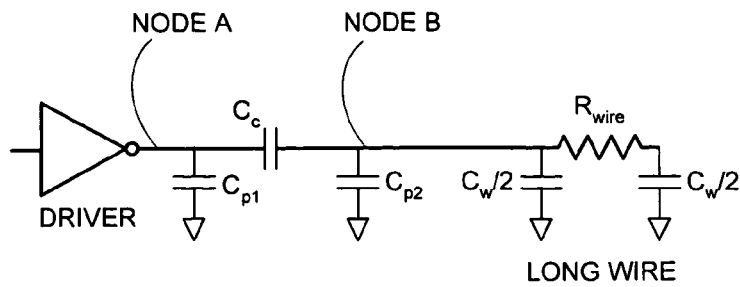
FIG. 1 illustrates a circuit which includes a driver which drives a coupled wire through a coupling capacitor in accordance with an embodiment of the present invention.

FIG. 1 illustrates a circuit which includes a driver which drives a coupled wire through a coupling capacitor in accordance with an embodiment of the present invention. Note that in FIG. 1, $C_w$ represents the capacitance of the wire and $C_{p2}$ represents any parasitic capacitance on the right side of the coupling capacitor. Furthermore, $C_{p1}$ represents any parasitic capacitance on the left side of the coupling capacitor. Note also that $C_{p1}$ has no effect on the voltage seen at node B; instead, its main effect is to slow down the voltage transition at node A.

One embodiment of the present invention limits voltage swing on an on-chip wire by inserting an explicit capacitor between the driver and the wire. This coupling capacitor ($C_c$), acts to divide the voltage applied to its left node ($V_A$), so that the voltage seen at its right node ($V_B$) is equivalent to:

$$V_B = V_A \cdot \left( \frac{C_c}{C_c + C_{p2} + C_w} \right)$$

By careful sizing of the coupling capacitance $C_c$ (and its parasitic capacitor $C_{p2}$), the voltage swing on the wire can be set for the desired power consumption. For example, if a particular coupling capacitor design has a parasitic capacitor $C_{p2}$ equal to half of its coupling capacitance $C_c$, then sizing the capacitor so that $C_c$ is equal to the $C_w/8.5$ results in a 10× voltage reduction. This results in a 10× power reduction on the coupled wire as well.

Because the coupling capacitor connects in series with the downstream wire load, the effective load ($C_{eff}$) seen by the driver is reduced:

$$C_{eff} = C_{p1} + \left( \frac{C_c \cdot (C_{p2} + C_w)}{C_c + C_{p2} + C_w} \right).$$

If $C_c = 2 \cdot C_{p2} = C_w/8.5$, then the $C_{eff} = 0.164 \cdot C_w$. By contrast, without a coupling capacitor between driver and wire, the $C_{eff} = C_w$, which is six times larger.

One advantage gained from reducing effective wire load is that the circuit driving the reduced wire load can be much smaller (in the example above, the driver can be six times smaller). Unlike the wire, the driving circuit switches from the full power supply, so reducing its capacitive load can significantly improve power consumption. Existing methods for restricting the voltage swing on the wire do not reduce the effective wire load; therefore the circuit driving the wire consumes significantly more power.

If the size of the driving circuit is not reduced, the circuit sees a dramatic improvement in performance, due to the substantially reduced load.

Another advantage of the coupling capacitor comes from the fact that on-chip wires are highly resistive, thus acting as distributed low-pass filters. The wire's series resistance filters out high-frequency components, slowing down fast edges and reducing overall performance. Capacitively coupled drivers inject fast edges into the wire, pre-emphasizing signals and canceling some of the wire's high-frequency attenuation. This permits higher bandwidth signaling on the wire.

A third advantage of using a coupling capacitor is that the wire may be biased to any DC level because the coupling capacitor $C_c$ does not conduct a DC voltage from the driver to the wire. This allows the biasing of the wire at or close to the power supply $V_{dd}$, thus enabling the use of fast NMOS-based amplifiers at the receiver.

Wire Overlaps for Coupling Capacitors

Figure 2:
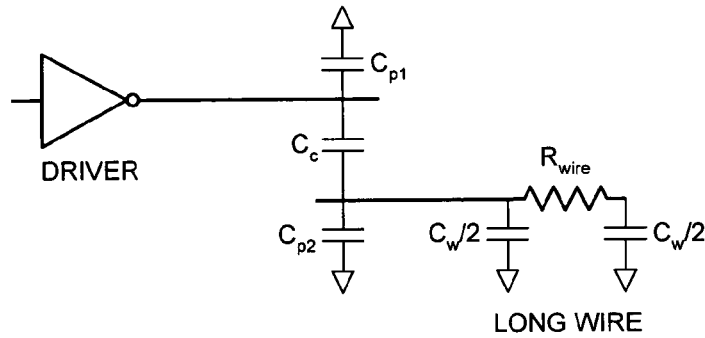
FIG. 2 illustrates circuit that drives a coupled wire using a coupling capacitor created by wire overlap in accordance with an embodiment of the present invention.

FIG. 2 illustrates a circuit for driving a wire using a coupling capacitor created by wire overlap in accordance with an embodiment of the present invention.

One embodiment of the present invention leverages physical VLSI constraints in the construction of the coupling capacitor. Wires on VLSI chips traditionally have a high aspect ratio. In other words, their height divided by their width is typically around 2-2.5. The aspect ratio helps to minimize the effects of on-chip wire resistance. As technologies scale, wire resistance degrades further, so wire aspect ratios are not likely to fall. Rather, aspect ratios will likely continue to be as large as possible without causing noise coupling problems.

Note that larger aspect ratios are accompanied by problems in addition to noise coupling. One such problem is manufacturability; wires that look like tall and skinny stalagmites become difficult to etch and fill properly. Hence, aspect ratios can be expected to be limited by manufacturing issues.

Coupling arises when wires are placed next to each other. Because they have high aspect ratios, two wires placed side by side have a large sideways exposure to each other. Hence, these wires have side-to-side coupling much larger than their ground coupling. In today's technologies, minimum-spaced wires have side-to-side capacitance that is 70% of their total capacitance: 35% of the total capacitance is to its right-side neighbor, and 35% of the total capacitance is to its left-side neighbor.

Normally this high side-to-side coupling leads to dangerous noise problems. However, the effect can be exploited in order to capacitively couple wires. Consider a driver that drives a short stub wire, as shown in FIG. 2. This stub wire can be placed very close to the coupled wire that is to be driven. The length of the overlap determines the coupling capacitance between the driver and the wire. Because these coupled wires have large side-to-side capacitance compared to their parasitic capacitance, the parasitic capacitances $C_{p1}$ and $C_{p2}$ are small compared to $C_c$.

Designing the overlap to be approximately ⅓ the length of the coupled wire achieves a 10× reduction in voltage swing, leading to a 10× reduction in power dissipated on the wire.

One benefit of using wire overlaps for the coupling capacitor is the ability to design with well-matched, predictable capacitance values. If, due to process variations, wire capacitances skew more or less than expected, the coupling ratio remains constant.

Pitchfork Structures for Coupling Capacitors

Figure 3:
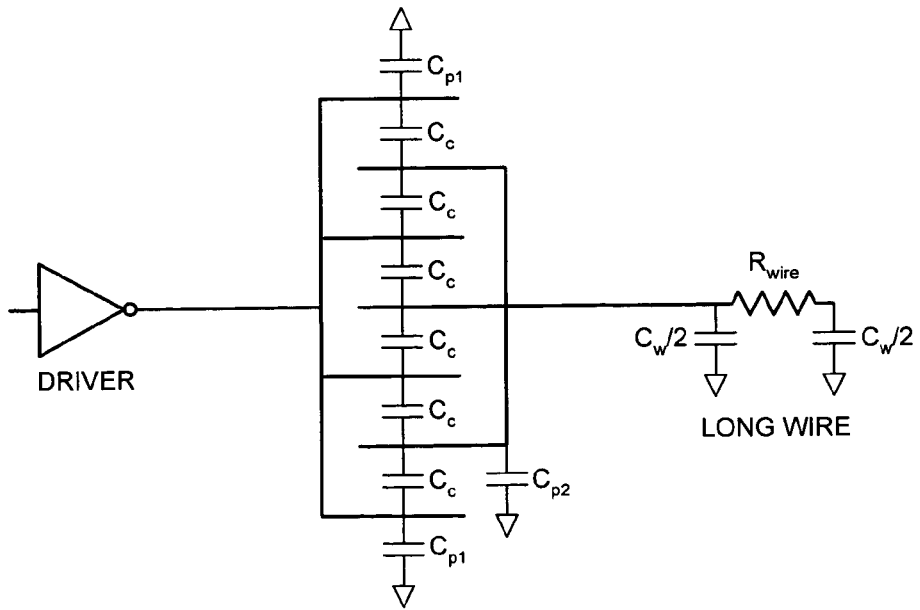
FIG. 3 illustrates a pitchfork overlap pattern for creating a coupling capacitor in accordance with an embodiment of the present invention.

FIG. 3 illustrates a pitchfork overlap for creating a coupling capacitor in accordance with an embodiment of the present invention.

In a pitchfork construction, the coupled wire is drawn as the narrower, interior pitchfork while the driver wire is drawn as the wider, exterior pitchfork. The coupled wire is placed on the interior of the pitchfork to minimize the parasitic capacitor $C_{p2}$, albeit at the cost of slightly higher $C_{p1}$.

In an alternative arrangement, the coupled wire may be placed on the outside of the pitch fork, minimizing the parasitic capacitor $C_{p1}$, at the cost of $C_{p2}$. This scheme actually saves power, because the capacitor $C_{p2}$ is reduced by the coupling capacitor $C_c$. Hence, larger $C_{p2}$ matters less than a larger $C_{p1}$.

Using multiple legs in the pitchfork construction reduces the necessary length of the overlap by a factor equal to the number of tines in the pitchfork. Note that this construction is annotated with the notation m/n where m is the number of pitchfork legs on the driver and n is the number of legs on the wire. For example, FIG. 3 illustrates a 4/3 pitchfork. Here, for a 10× reduction in voltage (and in power) only about 1/20 of the total wire length must be overlapped.

Adding "tines" to the pitchfork structure reduces wire overlap and, to a point, parasitic capacitances $C_{p1}$ and $C_{p2}$. However, adding too many tines actually increases $C_{p1}$ and $C_{p2}$ due to connector wires tying tines together. There is an optimal number of tines, dependent on technology parameters, in order to balance the wire overlap area and the parasitic capacitances.

Although the pitchfork structure requires more layout area than an ordinary wire, the impact can be mitigated using a layout adjustment. Designers typically draw long wires wider than minimum in order to reduce effects of on-chip wire resistance. However, the coupled wire inside a pitchfork can be drawn to minimum width while the long wire after the pitchfork can be several times the minimum width. This layout adjustment simultaneously reduces the parasitic capacitances, improves coupling, and minimizes the layout area penalty caused by using a pitchfork structure.

Multi-Layer Pitchforks for Coupling Capacitors

Figure 4:
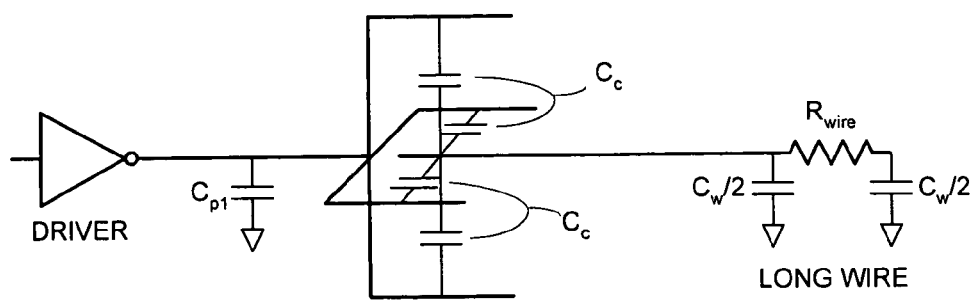
FIG. 4 illustrates a multi-layer pitchfork overlap pattern for creating a coupling capacitor in accordance with an embodiment of the present invention.

FIG. 4 illustrates a multi-layer pitchfork overlap for creating a coupling capacitor in accordance with an embodiment of the present invention.

For a small cost in metallization layers above and below the pitchfork, designers can extend tines the pitchfork to metal layers above and below. A simple example using a basic 2/1 pitchfork can replicate driver legs above and below the single wire leg (resulting in a 4/1 pitchfork as in FIG. 4). This essentially eliminates the parasitic capacitor $C_{p2}$. In this case, achieving a 10× reduction in voltage only requires an overlap length of ⅙ the wire length. Multi-layer pitchforks with more tines notice a greater benefit.

As above, another scheme puts the drive leg inside a multi-layer receiving pitchfork. This essentially eliminates $C_{p1}$ at the cost of higher $C_{p2}$. Because $C_{p2}$ is reduced by $C_c$, this is a reasonable design tradeoff.

Using a MOS Device as a Coupling Capacitor

Designers can also potentially use transistor gates as the coupling capacitor. For example, the driver drives the gate of a transistor whose drain and source are tied together on the coupled wire end. Alternately, the configuration can be flipped, with the driver connected to the drain and source nodes and the gate connected to the coupled wire.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus for driving on-chip wires using capacitive coupling, comprising:
    a driven wire that receives a driven signal from a driver; and
    a coupling capacitor coupled between the driven wire and a coupled wire, wherein the driven signal feeds from the driven wire and through the coupling capacitor on the coupled wire, wherein the driven wire forks and runs parallel to the coupled wire for a specified distance and with a specified separation in the same metal layer as the coupled wire to form the coupling capacitor;
    wherein feeding the driven signal through the coupling capacitor reduces the voltage swing of a corresponding coupled signal on the coupled wire, thereby lessening the power required to drive the coupled signal onto the coupled wire.

2. The apparatus of claim 1, wherein the coupling capacitor ($C_{coupling}$) in series with the load capacitance of the coupled wire ($C_{load}$) forms a voltage divider that produces $V_{coupled\_wire} = V_{driven\_wire} \cdot (C_{coupling}/(C_{coupling}+C_{load}))$.

3. The apparatus of claim 1, wherein the coupled wire forks and runs parallel to the driven wire in the metal layers above and below the driven wire.

4. The apparatus of claim 3, wherein the coupled wire has a minimum width within the fork.

5. The apparatus of claim 1, wherein the coupled wire forks and runs parallel to the driven wire in the same metal layer as the driven wire.

6. The apparatus of claim 1, wherein the driven wire forks and runs parallel to the coupled wire in the metal layers above and below the coupled wire.

7. The apparatus of claim 1, wherein the apparatus includes a biasing mechanism that biases the coupled wire to a predetermined voltage, thereby enabling subsequent logical transitions on the coupled wire to occur more quickly.

8. A method for driving on-chip wires using capacitive coupling, comprising:
    driving a signal onto a driven wire;
    feeding the signal from the driven wire through a coupling capacitor onto a coupled wire, wherein the driven wire forks and runs parallel to the coupled wire for a specified distance and with a specified separation in the same metal layer as the coupled wire to form the coupling capacitor;

wherein feeding the signal through the coupling capacitor reduces a voltage swing of a corresponding coupled signal on the coupled wire, thereby lessening the power required to drive the coupled signal on the coupled wire.

9. The method of claim 8, wherein the method further comprises forking the coupled wire and running the coupled wire parallel to the driven wire in the metal layers above and below the driven wire.

10. The method of claim 9, wherein the coupled wire has a minimum width within the fork.

11. The method of claim 8, wherein the coupling capacitor ($C_{coupling}$) in series with the load capacitance ($C_{load}$) of the coupled wire forms a voltage divider that produces $V_{coupled\_wire} = V_{driven\_wire} \cdot (C_{coupling}/(C_{coupling}+C_{load}))$.

12. The method of claim 8, wherein the method further comprises forking the driven wire and running the driven wire parallel to the coupled wire in the metal layers above and below the coupled wire.

13. The method of claim 8, wherein the method further comprises biasing the coupled wire to a predetermined voltage, thereby enabling subsequent logical transitions on the coupled wire to occur more quickly.

14. The method of claim 8, wherein the method further comprises forking the coupled wire and running the coupled wire parallel to the driven wire in the same metal layer as the driven wire.

15. A computer system which uses capacitive coupling for driving on-chip wires, comprising:
   a processor;
   a memory;
   a driven wire located in the processor, the memory or in other supporting circuitry in the computer system, wherein the driven wire receives a driven signal from a driver; and
   a coupling capacitor coupled between the driven wire and a coupled wire, wherein the driven signal feeds from the driven wire and through the coupling capacitor onto the coupled wire, wherein the driven wire forks and runs parallel to the coupled wire for a specified distance and with a specified separation in the same metal layer as the coupled wire to form the coupling capacitor;

wherein feeding the driven signal through the coupling capacitor reduces the voltage swing of the corresponding coupled signal on the coupled wire, thereby lessening the power required to drive the coupled signal on the coupled wire.

16. The computer system of claim 15, wherein the coupled wire forks and runs parallel to the driven wire in the metal layers above and below the driven wire.

17. The computer system of claim 16, wherein the coupled wire has a minimum width within the fork.

18. The computer system of claim 15, wherein the driven wire forks and runs parallel to the coupled wire in the metal layers above and below the coupled wire.

19. The computer system of claim 15, wherein the computer system includes a biasing mechanism that biases the coupled wire to a predetermined voltage, thereby enabling subsequent logical transitions on the coupled wire to occur more quickly.

20. The computer system of claim 15, wherein the coupling capacitor ($C_{coupling}$) in series with the load capacitance of the coupled wire ($C_{load}$) forms a voltage divider that produces $V_{coupled\_wire} = V_{driven\_wire} \cdot (C_{coupling}/(C_{coupling}+C_{load}))$.

21. The computer system of claim 15, wherein the coupled wire forks and runs parallel to the driven wire in the same metal layer as the driven wire.

* * * * *